US011873666B2

(12) United States Patent
Bouan

(10) Patent No.: US 11,873,666 B2
(45) Date of Patent: Jan. 16, 2024

(54) ANTI-THEFT DEVICE

(71) Applicant: Fors France, Champigny sur Marne (FR)

(72) Inventor: Bruno Bouan, La Varenne Saint Hilarie (FR)

(73) Assignee: Fors France, Champigny sur Marne (FR)

( * ) Notice: Subject to any disclaimer, the term of this patent is extended or adjusted under 35 U.S.C. 154(b) by 298 days.

(21) Appl. No.: 17/282,265

(22) PCT Filed: Oct. 2, 2019

(86) PCT No.: PCT/FR2019/052330
§ 371 (c)(1),
(2) Date: Apr. 1, 2021

(87) PCT Pub. No.: WO2020/070444
PCT Pub. Date: Apr. 9, 2020

(65) Prior Publication Data

US 2021/0372167 A1 Dec. 2, 2021

(30) Foreign Application Priority Data

Oct. 2, 2018 (FR) ...................................... 1859121
Feb. 26, 2019 (FR) ...................................... 1901968
Jul. 1, 2019 (FR) ...................................... 1907257

(51) Int. Cl.
*E05B 73/00* (2006.01)

(52) U.S. Cl.
CPC ...... *E05B 73/0041* (2013.01); *E05B 73/0052* (2013.01)

(58) Field of Classification Search
CPC ............ E05B 73/0029; E05B 73/0035; E05B 73/0041; E05B 73/0052
See application file for complete search history.

(56) References Cited

U.S. PATENT DOCUMENTS 6,326,890 B1 * 12/2001 Costa ................. E05B 73/0041 340/568.1
7,259,674 B2 * 8/2007 Marsilio ........... G08B 13/2434 215/279
7,650,768 B2 * 1/2010 Fawcett ............. E05B 73/0041 70/57.1

(Continued)

FOREIGN PATENT DOCUMENTS

BR PI0606079 A 8/2008
DE 60124235 6/2007

(Continued)

OTHER PUBLICATIONS

International Search Report for International Application No. PCT/FR2019/052330 dated Jan. 31, 2020, 4 pages.

(Continued)

*Primary Examiner* — Christopher J Boswell
(74) *Attorney, Agent, or Firm* — TraskBritt

(57) ABSTRACT

An anti-theft device comprises a notched strap having a free end and an end rigidly connected to a block, which locks the notched surface of the strap in the closed position when the free end is inserted into an insertion slot provided in the locking block. The anti-theft device further comprises theft detection means.

11 Claims, 14 Drawing Sheets

(56) References Cited

U.S. PATENT DOCUMENTS

| | | | | |
|---|---|---|---|---|
| 8,294,583 | B2 * | 10/2012 | Sayegh | E05B 73/0017 70/57.1 |
| 8,390,460 | B2 * | 3/2013 | Zinner | E05B 73/0041 340/572.9 |
| 9,518,407 | B2 * | 12/2016 | Thoonsen | G09F 3/14 |
| 9,790,715 | B2 * | 10/2017 | Bouan | E05B 73/0041 |
| 2005/0062608 | A1 * | 3/2005 | Costa | B65D 55/08 340/572.9 |
| 2005/0211658 | A1 * | 9/2005 | Bagration De Ulloa | B65D 55/145 70/57.1 |
| 2007/0120701 | A1 * | 5/2007 | Teller | G09F 23/08 340/693.9 |
| 2008/0258478 | A1 | 10/2008 | Lopez et al. | |
| 2020/0157854 | A1 * | 5/2020 | Piccoli | B65D 39/0052 |

FOREIGN PATENT DOCUMENTS

| | | | |
|---|---|---|---|
| EP | 0282678 | A1 | 9/1988 |
| GB | 2440420 | A | 1/2008 |
| WO | 2003/046319 | A1 | 6/2003 |
| WO | 2009/032038 | A1 | 3/2009 |
| WO | 2014/207356 | A1 | 12/2014 |

OTHER PUBLICATIONS

International Written Opinion for International Application No. PCT/FR2019/052330 dated Jan. 31, 2020, 18 pages.

Larousse Dictionary, Definition of Cran, Website: https://www.larousse.fr/dictionnaires/francais/cran/20176, visited Mar. 29, 2021, 1 page.

* cited by examiner

ANTI-THEFT DEVICE

CROSS-REFERENCE TO RELATED APPLICATIONS

This application is a national phase entry under 35 U.S.C. § 371 of International Patent Application PCT/FR2019/052330, filed Oct. 2, 2019, designating the United States of America and published as International Patent Publication WO 2020/070444 A1 on Apr. 9, 2020, which claims the benefit under Article 8 of the Patent Cooperation Treaty to French Patent Application Serial No. 1859121, filed Oct. 2, 2018, French Patent Application Serial No. 1901968, filed Feb. 26, 2019 and French Patent Application Serial No. 1907257, filed Jul. 1, 2019.

TECHNICAL FIELD

The present disclosure relates to the field of anti-theft products. It is designed to protect items freely available for distribution, for example, on the shelves of a supermarket.

BACKGROUND

The purpose of the present disclosure is to provide an anti-theft device for items comprising parts that can be encircled by straps or suchlike, which can be applied to the items and give them adequate protection against shoplifting.

Such items are well known and usually comprise a body made of a plastic material that can be fixed onto the item to be protected against shoplifting. This body contains a detection means that interacts with a detector at the exit of the point of sale. A magnetic locking block prevents the body from being opened and the anti-theft device from being removed by any person not in possession of the appropriate unlocking device.

More particularly, the present disclosure concerns the field of anti-theft devices designed for packaging with a groove for a peripheral ridge such as a beverage can, tin can or a bottle with a neck having an annular ring or even a sports item such as a golf club, and more generally any item having an area in which a strap can be engaged.

In a known way, anti-theft devices are provided with an electronic component, usually passive, capable of being detected if it is immersed in an electromagnetic field, normally generated at the guided exit of a shop or an establishment where anti-theft devices, now increasingly more widespread, are used.

These devices are connected to the item to be protected against theft and are then separated therefrom by breakage or removal by means of special equipment, usually when the item is conventionally purchased.

UK Patent GB2440420 describes a device comprising a body incorporating an electronic detection device and an attaching means for attaching the tag body to an article, as well as a locking means. The locking means includes a locking member movable between a locking position wherein the attaching means is prevented from being removed from the article and a release position wherein the attaching means can be detached from the article. This attaching means is formed by a wire cable surrounded by a spiral wire, passing through a metal body via a first hole before surrounding a component to be protected and passing back through the metal body via a second hole. This cable is locked at one end by a gripping means and at the other end is attached to the housing.

Locking is achieved by tightening at the intersection of the two segments of the metal cable, the winding of the second spiral wire serving to prevent the relative movement of the two segments of cable.

In fact, by exerting sufficient traction, the loop formed by the cable can be enlarged and the protected article removed. Moreover, the cable remains engaged in the metal body to form a loop that can be constricted by pulling on one of its ends once the loop is positioned around the article to be protected.

Brazilian patent BRPI0606079 is also known. It describes an anti-theft device for bottles that comprises two rectangular prismatic bodies connected together and laterally offset and containing an electric detection coil. A loop with a toothed rack passes through this body and is locked at its end by a protuberance enabling the size of the loop to be reduced.

This solution does not allow the loop to be engaged around an article with a neck that extends along a part with a section greater than the largest size of the loop.

European Patent EP0282678 describes an anti-theft device for articles or objects having at least one hooking structure. This device comprises an anti-theft magnetic plate and means for connecting the magnetic plate to the hooking structure. The connection means comprise locking means that cooperate with the locking device of the magnetic plate and lock against the latter, and at the other end means for connecting the locking means/magnetic plate assembly to the hooking structure of the object or article to be protected.

This device is not suitable for protecting a bottle.

Patent application WO2009032038 describes a device to protect an article. A magnetic locking mechanism comprises a magnetically actuable latch and a flexible element. The flexible element that stresses the magnetic latch is arranged in a housing in which an internal passageway defines a belt pathway configured to slidingly receive the belt.

Patent application WO03046319 describes an anti-theft device for articles having certain portions that can be surround by straps or the like. The device comprises a strap, a container that accommodates an excitable signaling component and a contact element into which one end of the strap can be inserted and locked, the strap at least partially incorporating a metallic insert.

The solutions of the prior art are not completely satisfactory because the means of detection, of locking the strap and of locking the strap-locking means are combined in one molded part that has weaknesses. By exerting even a moderate effort, an ill-intentioned person can break the device and thus neutralize the anti-theft function.

BRIEF SUMMARY

The present disclosure aims to overcome this drawback by proposing an anti-theft device comprising a notched strap having a free end and an end rigidly connected to a block, which locks the notched surface of the notched strap in the closed position when the free end is inserted into an insertion slot provided in the locking block, the anti-theft device further comprising theft detection means, characterized in that the locking block has a hollow neck, extended at its base by the notched strap, and has on the opposite side a slot with a cross-section larger or equal to the cross-section of the strap at the top of a tooth, the device further comprising a weight with a locking front surface, the weight being longitudinally movable inside the cylindrical neck and lockable in the locking position by a locking means, the anti-theft detection means being housed in a second block having a housing to receive the neck of the locking block. According to a first variation, the second block is extended by a protrusion having a cylindrical cavity directed toward the strap and closed at its opposite surface.

According to a second variation, the detection block rotates freely about the neck.

Preferably, the strap and the locking block are molded from a plastics material, the strap comprising a metallic reinforcement.

According to a first embodiment, the metallic reinforcement is formed by a metallic strip having lateral tabs connecting to the edge of the strap made of a plastics material.

According to a third embodiment, the strap has projecting protuberances on its inner surface, the metallic reinforcement having apertures complementary to the protuberances.

According to a fourth embodiment, the metallic reinforcement is overmolded by the plastics material of the strap.

According to a fifth embodiment, the device comprises at least one additional means of interaction with the notched part of the strap in the closed position. This additional means of interaction with the notched part of the strap is advantageously at least one tooth provided on the surface of the neck.

According to another variation, the device comprises an additional means of locking the strap that can be released by a manual deformation of the additional locking area. This additional locking means reduces the risk of unintentional unlocking by impacts applied axially on the unlocking weight. This additional locking means may be a tooth or a pawl that engages in an additional area of the strap, which can be released by local deformation of the strap so as to enable it to slide after releasing the weight.

BRIEF DESCRIPTION OF THE DRAWINGS

A better understanding of the present disclosure will emerge from the following detailed description of some non-limiting examples of embodiments of the present disclosure, with reference to the accompanying drawings in which.

DETAILED DESCRIPTION

General Description of a First Embodiment

The first embodiment is more particularly intended to be placed on the neck of a bottle.

Figure 1:
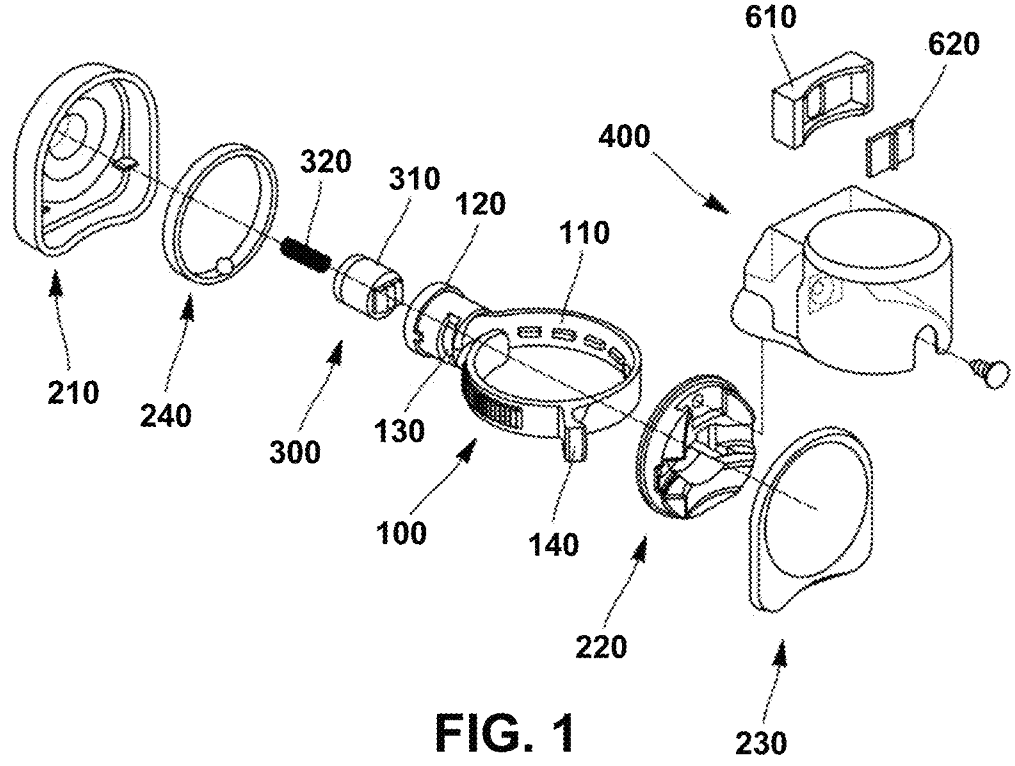
FIGS. 1 to 3 represent a partially transparent exploded view, top view and view from below, respectively, of a first embodiment.

As shown in FIG. 1, it comprises a first part (100) made of a flexible plastics materials forming a notched strap of rectangular section, with one smooth surface and one partially notched surface (110). This notched strap (100) is extended by a hollow body (120) extending perpendicularly in relation to the notched surface and having a slot (130) for inserting the free end of the strap (100). This hollow body (120) then ends with a tubular section surmounted by a cylindrical collar. The notched strap (110) and the hollow body (120) form a single molded piece made of a plastics material.

The end of the strap (100) opposite the hollow body (120) is free and has no protuberance. The section of the strap (100) is constant (except for the notches) along its entire useful length, from the free end to the tightening limit.

This hollow body (120) is opened on the side opposite the connection with the fixed end of the strap (100) by a slot (130) enabling the insertion of the free end of the notched strap (110). This slot (130) opens into a cylindrical median channel that passes lengthwise through the neck (120). The notched strap (110) has a lug (140) that allows the free end of the strap to be pushed into the neck (120) when the strap encircles the item to be protected, in order to push it in until sufficient tightening is achieved.

Figure 11:
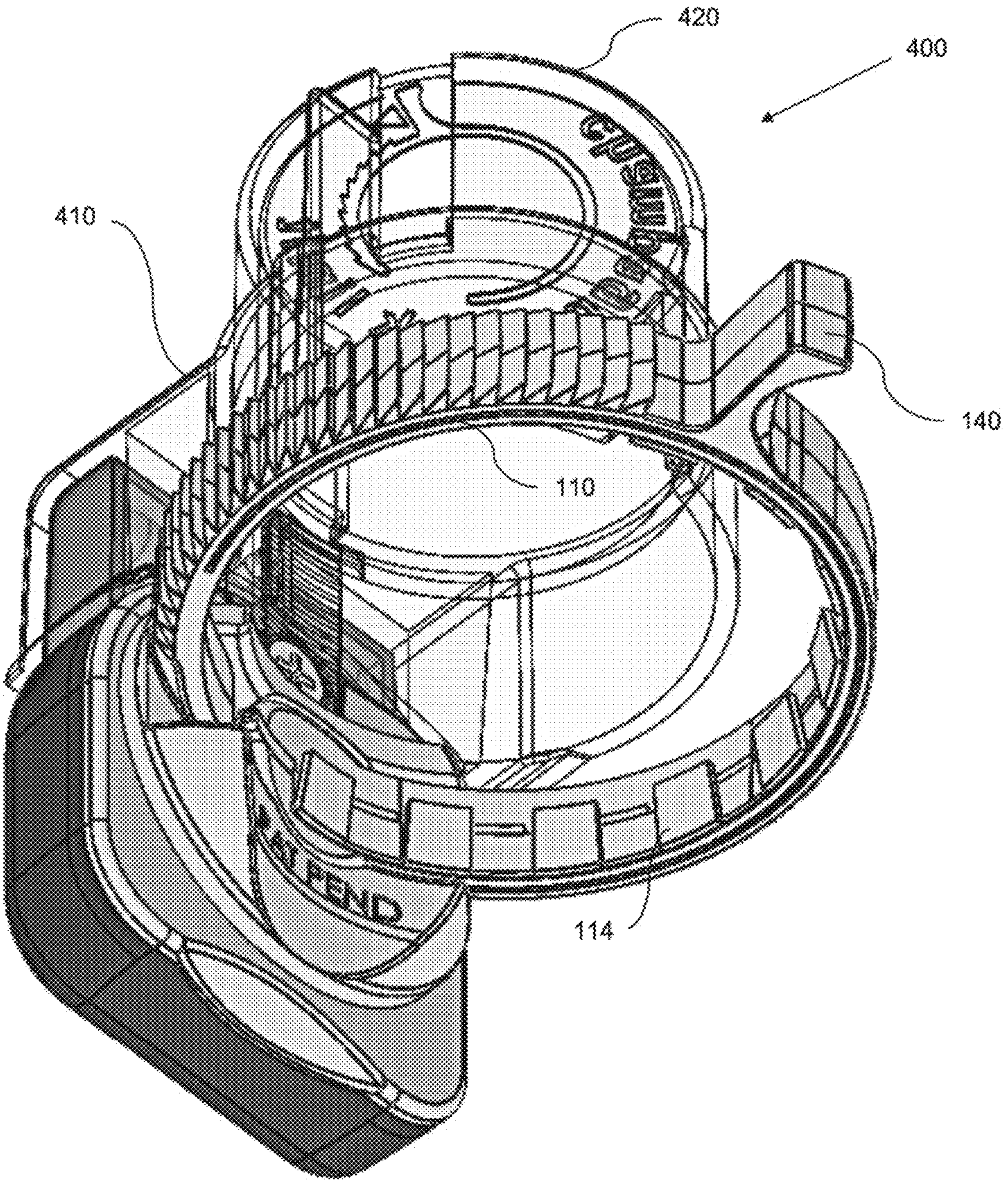
Figure 12:
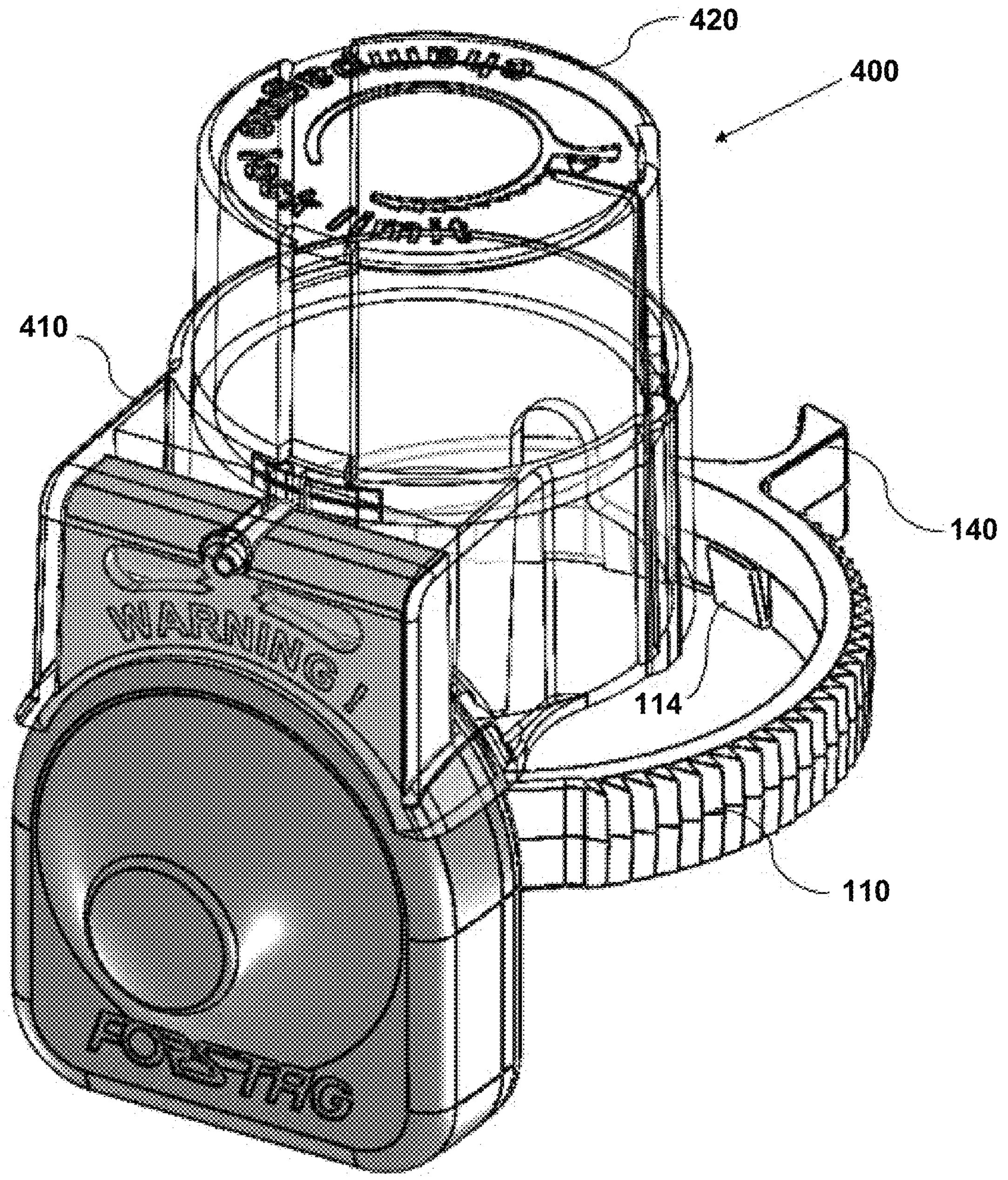
Figure 13:
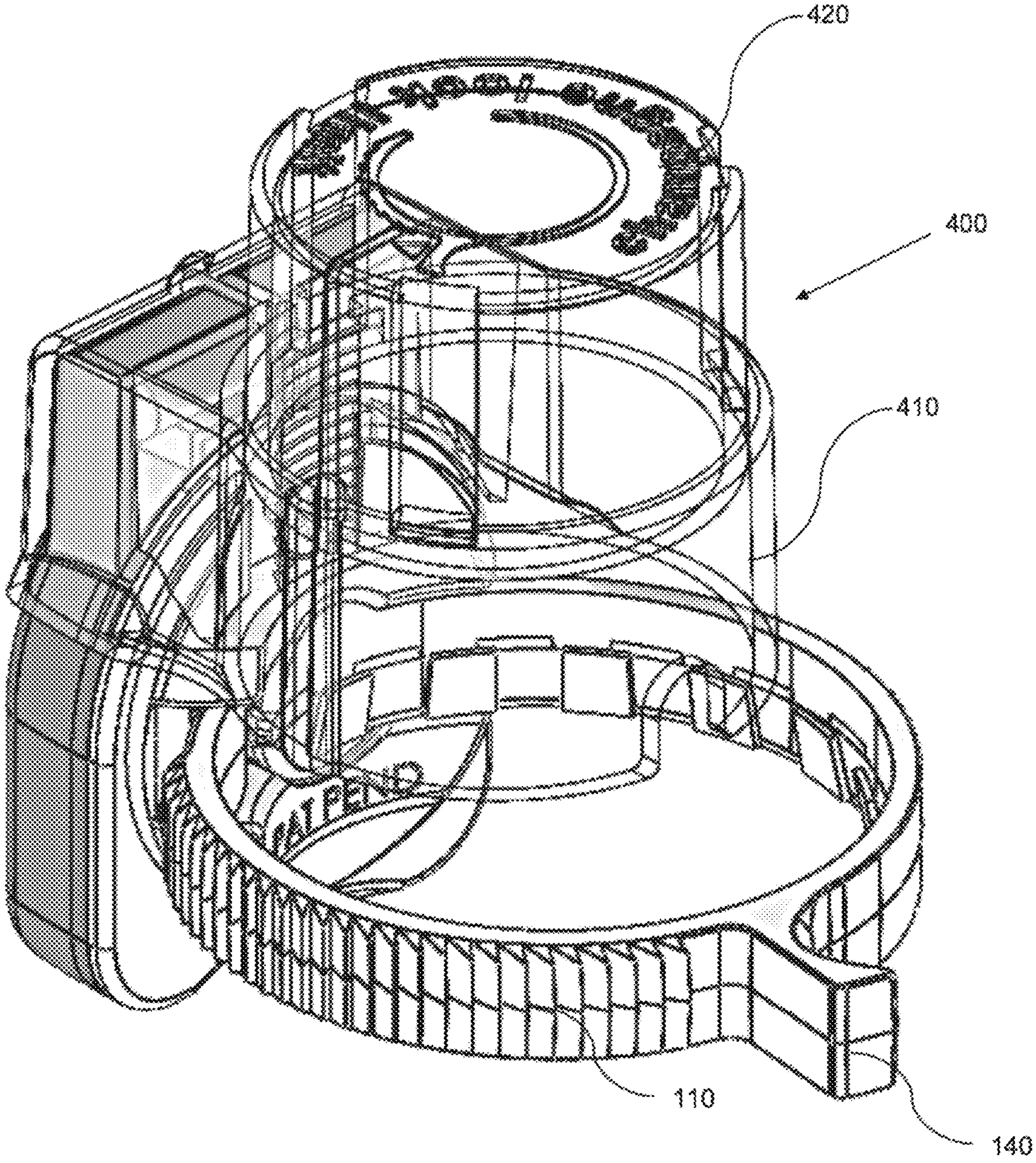
Figure 14:
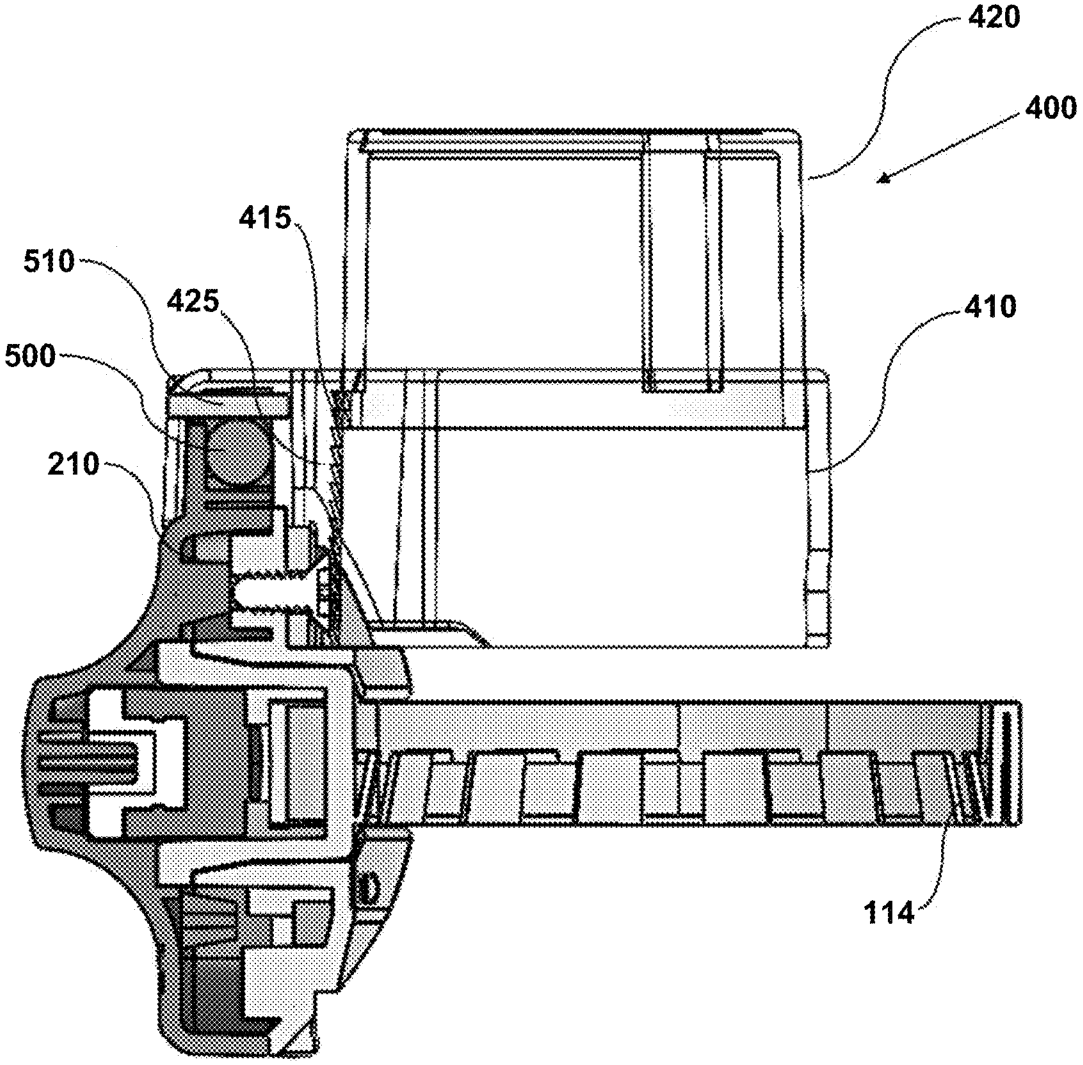
Figure 15:
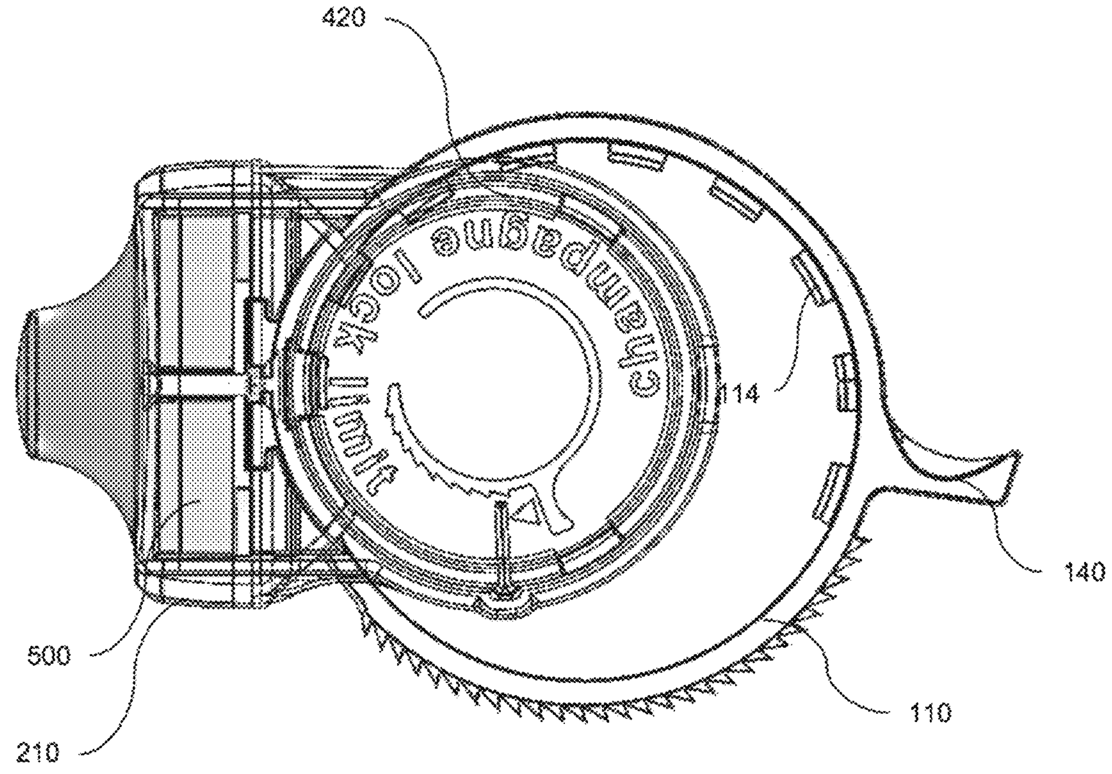
Figure 16:
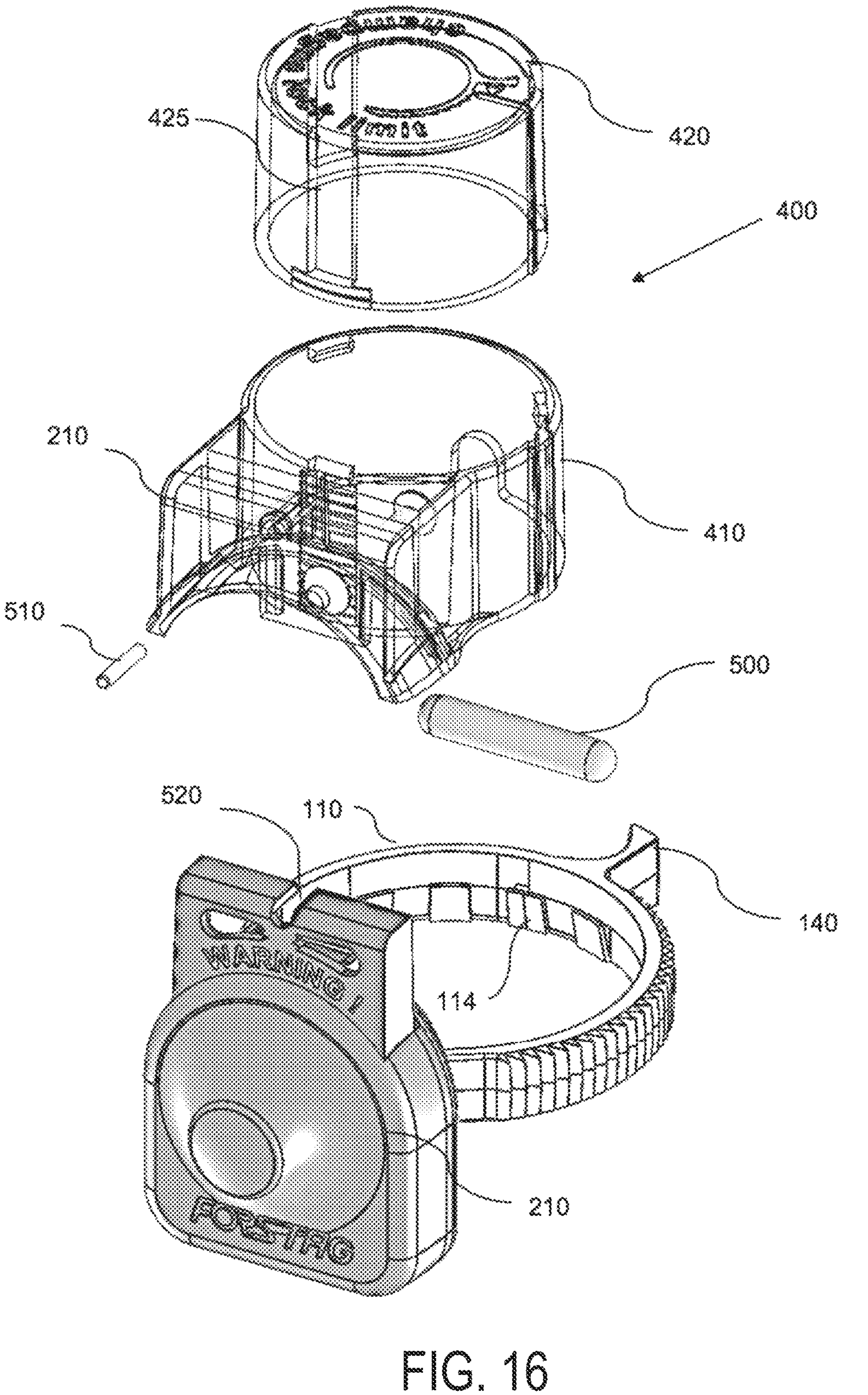

Alternatively, the notched strap (110) can be replaced by a strap with a retaining line that is continuous or discontinuous or provided with tapered deformable protuberances (114, FIG. 11 or 12).

In the embodiment described, the locking block (300) consists of a solution involving a weight (310) that slides in the hollow body (120).

The metallic weight (310) has a front surface that is complementary to the notched surface so as to ensure locking at rest, when it is pushed by the spring (320) in the direction of the strap. In this rest position, the notched area can be moved in the direction of an increasing engagement in the slot but, due to the cross-section of the teeth, cannot be withdrawn in the other direction.

In a known way, the metallic weight (310) can be withdrawn from its rest position by an unlocking device comprising a permanent magnet. The metallic weight (310) is then moved away from the notched surface of the strap (100), which allows the free end of the neck to be removed and the protected item to be released.

Figure 2:
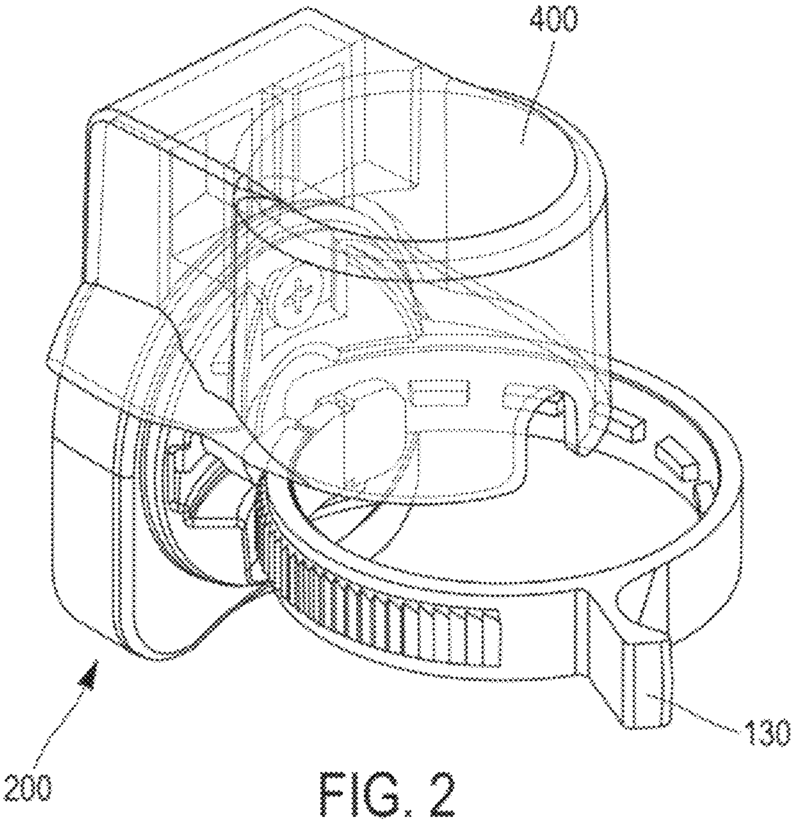
Figure 3:
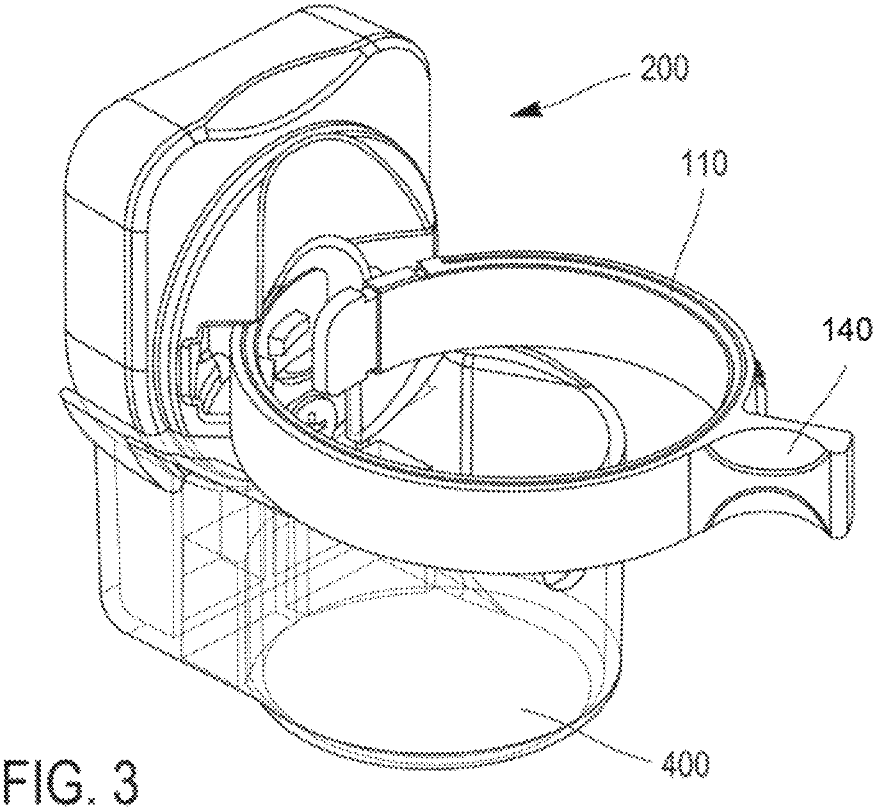

The device also comprises a detection block (200) (FIGS. 2-3) formed by a housing (210) that positions itself behind the neck (120), closed by a complementary part (220) that positions itself in front of the neck (120) and by an end plate (230). This detection block encloses an RF or AM loop (240), an RF or AM ferrite core (245) or an RFID tag.

This block is completed by a telescopic cap (400) receiving two parts (610, 620) made of ABS plastic and opening in the direction of the loop formed by the strap when it is closed to allow information to be shown, such as the price code. The part (610) has a window to display a tab (620), the relative position of which determines a price category in the form of a colored icon, a figure or any other graphic form. In order to code the value of the protected bottle, the user inserts his finger in the telescopic cap (400) before placing it on the neck of the bottle, which allows him to move the tab (620) to reveal the appropriate indicator. Once the device has been fitted onto the neck of the bottle, it is no longer possible to change the position of the tab (620) before removing it again after unlocking.

Description of a Second Variation

Figure 4:
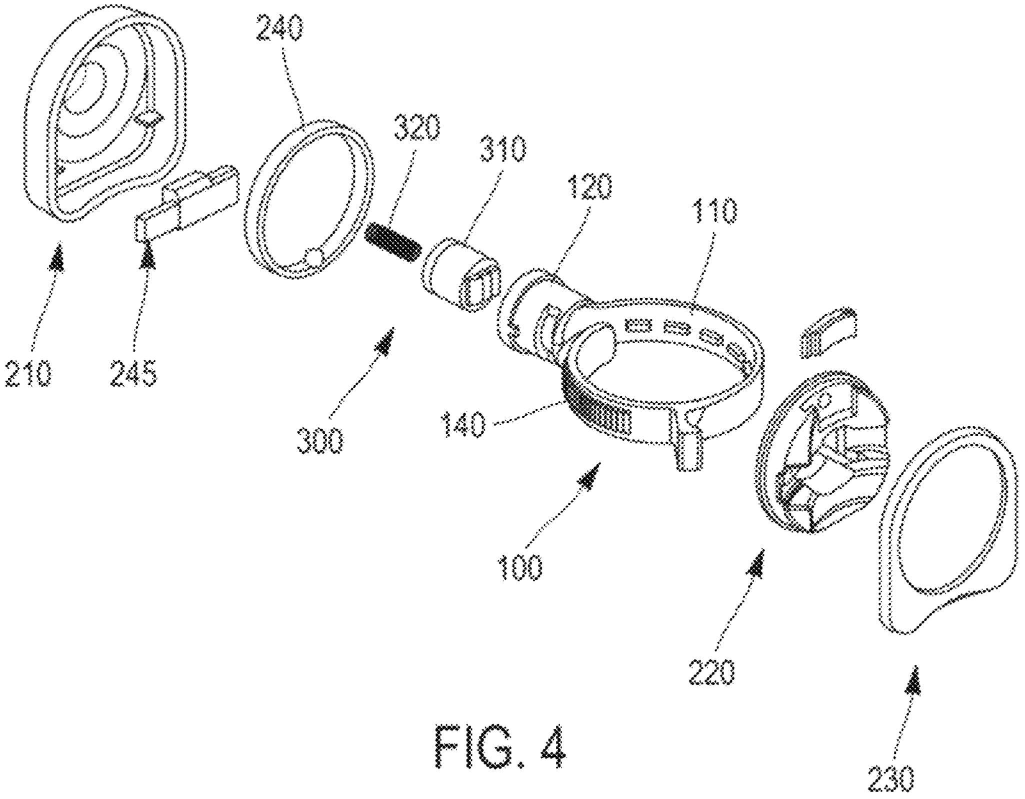
FIGS. 4 and 5 represent an exploded view and a perspective view, respectively, of a second embodiment.
Figure 5:
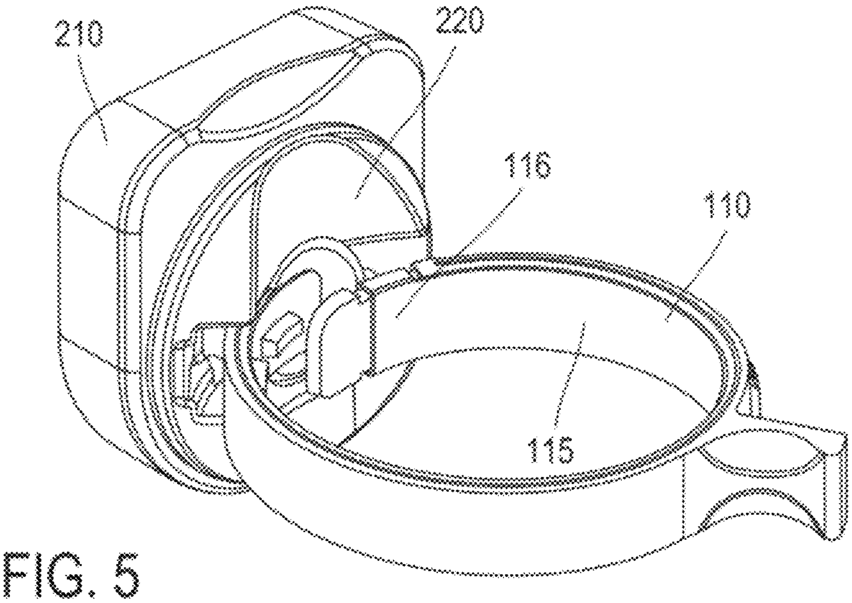

FIGS. 4 and 5 show a second variation that differs from the previous variation in that the housing (210) rotates freely in relation to the neck (120). For this purpose, the part (220) that closes the housing (210) has a channel with a section complementary to the outer section of the neck (120).

Thus, the detection block (120, 220) rotates freely in relation to the part (100) optionally comprising the notched surface (110), which prevents a malicious user from exerting a twisting torque to wrench off the anti-theft device.

The plastic strap (100) is lined with a flexible metallic band (115) fixed onto the strap (100) by folded tabs (116) to ensure connection with the lateral edge of the strap (100).

In this example, detection is achieved by a loop (240) and a ferrite core (245).

Reinforcement of the Strap

In order to reinforce the strap (100), a metallic band (115) is adjusted against the inner surface and held in place by protuberances (111) that engage in complementary apertures provided in the metallic band (115).

A second metallic band (118) can be inserted in the strap (100), for example, by overmolding or by insertion into a cylindrical housing.

Generally speaking, the strap (100) is reinforced by one or more metallic inserts:

- by overmolding one or more metallic bands during manufacture of the strap (100) by the injection of a plastics material;
- by clipping one or more metallic bands onto a strap (100) having protuberances complementary to holes formed in one or more metallic bands; or
- by inserting one or more metallic bands into a complementary slot formed in the strap (100).

Inner Surface of the Strap (100)

Figure 6:
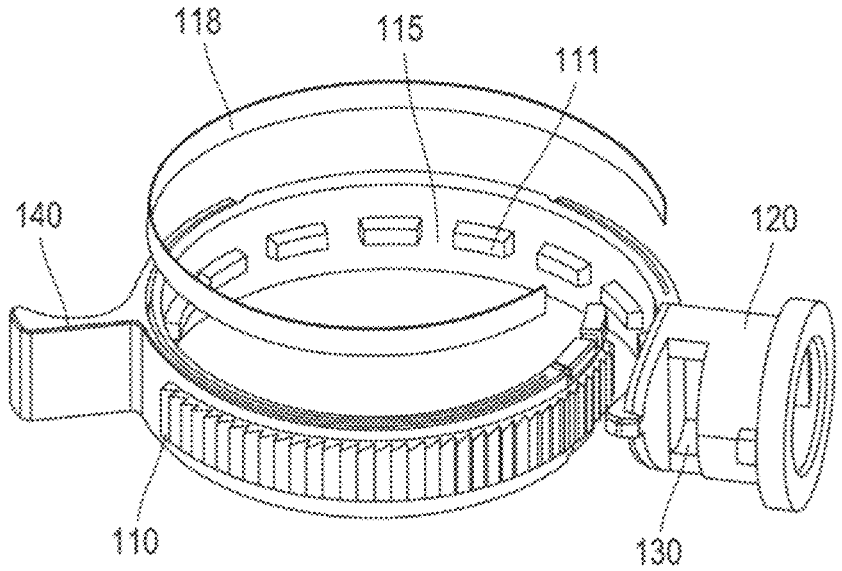
FIGS. 6 and 7 represent an exploded view and a partial perspective view, respectively, of the strap according to other embodiments.
Figure 7:
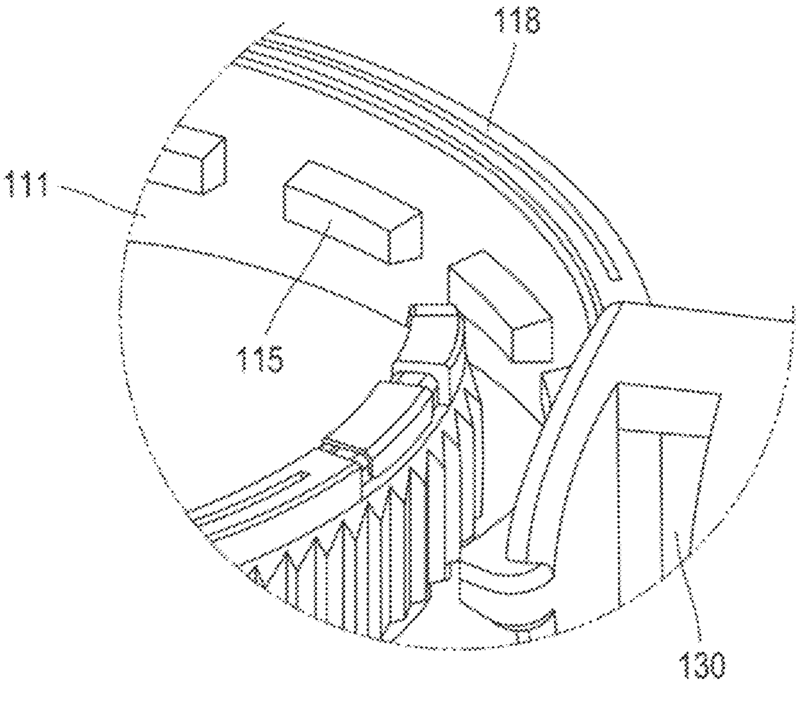

According to the variations, the strap (100) can have a notched inner surface (110—see FIG. 1 or 6), or a notched surface (115—see FIG. 7), or even a smooth surface, so as not to damage the aluminum sheets of the necks of champagne bottles, or even have tapered deformable protuberances (114) protruding from its inner surface (see FIG. 11 or 12).

Figure 17:
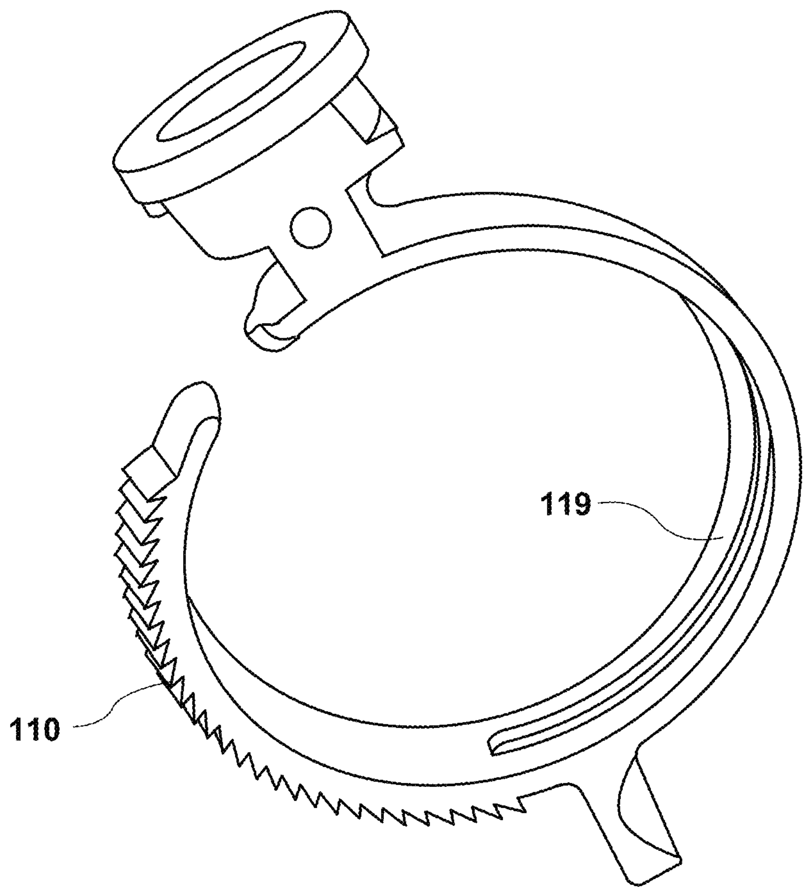

The smooth belt that may have a total or partially continuous retaining line (119), as shown in FIG. 17, has the effect of:

- preventing damage to the sheets of aluminum on bottles of champagne; and
- enabling the device to be easily removed from bottles with large necks (as the retaining collar of the belt is partially open).

Description of an Improved Embodiment

Figure 8:
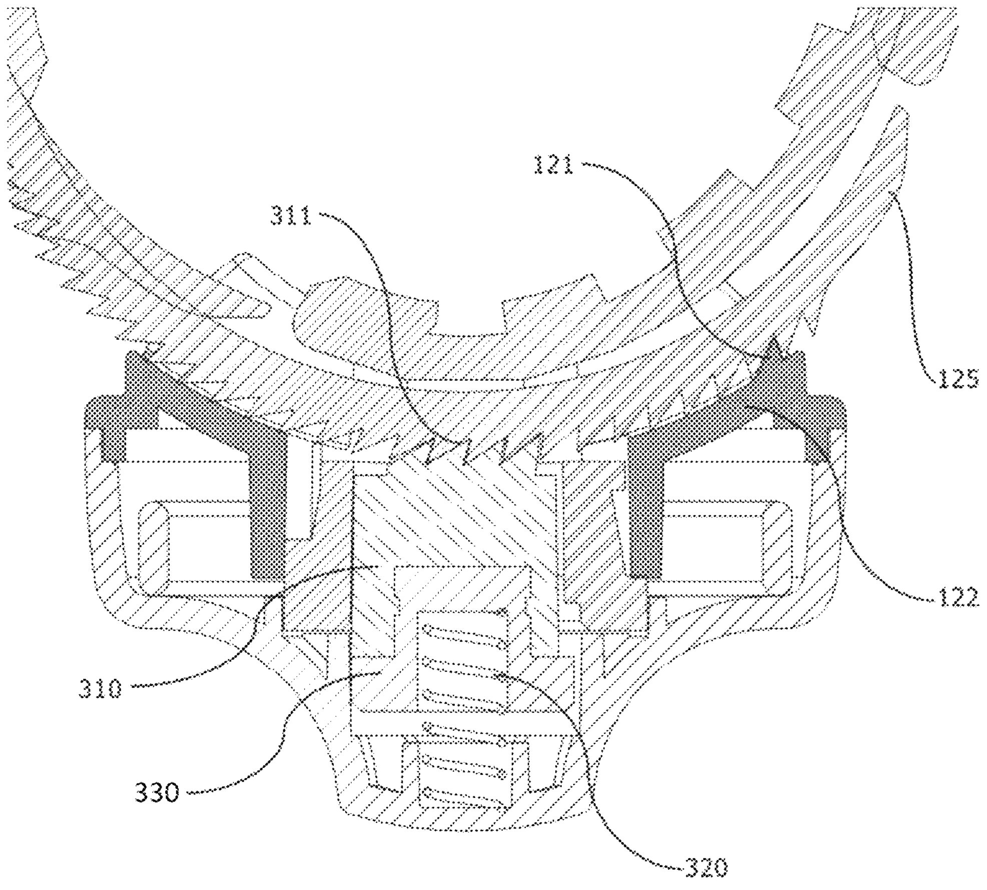
FIG. 8 represents a sectional view of another embodiment.
Figure 9:
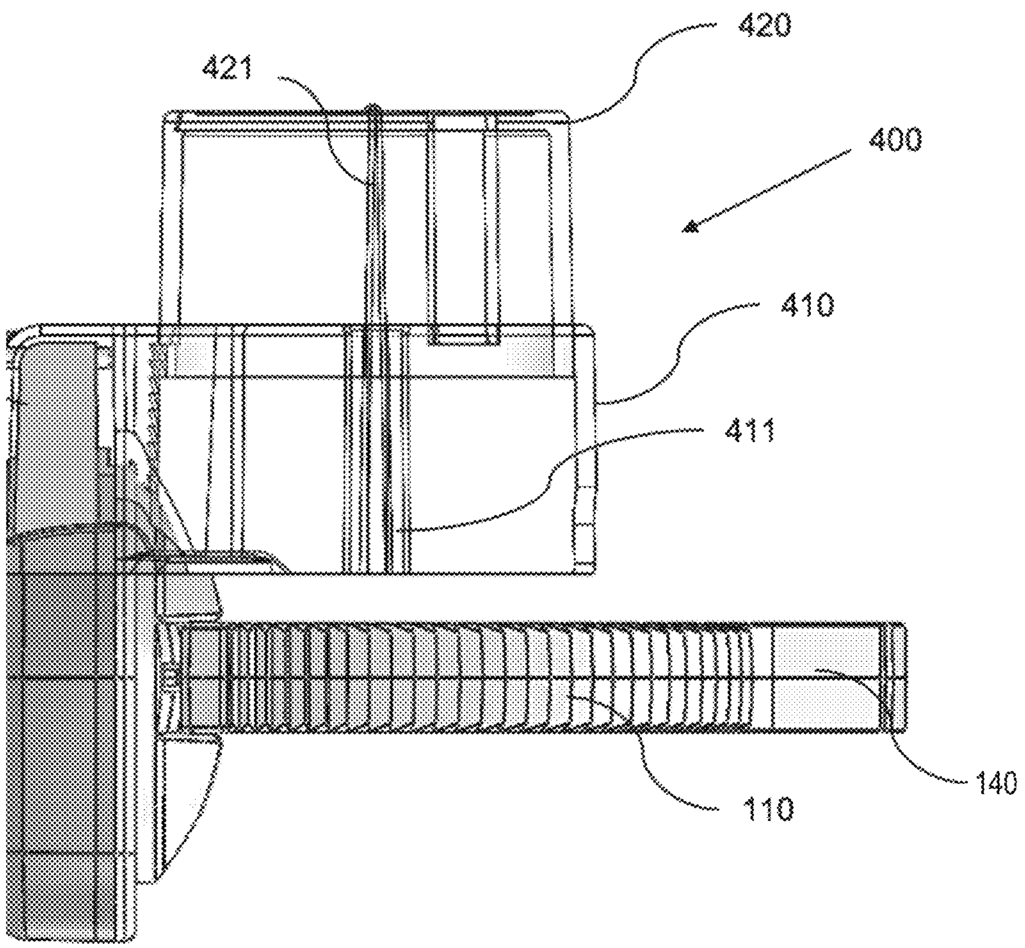
FIGS. 9 to 17 represent different views of another variation.
Figure 10:
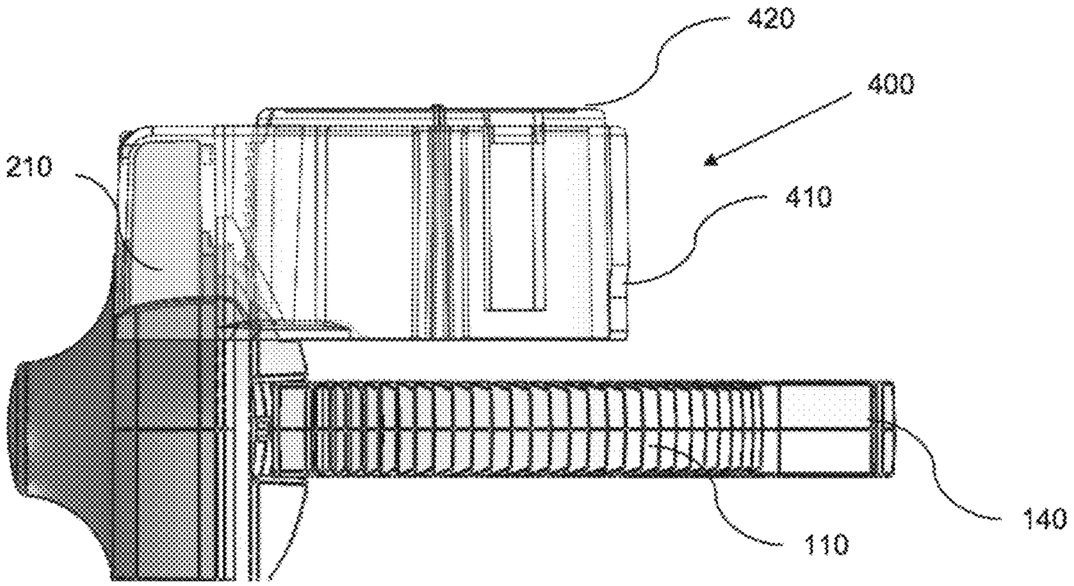

In order to prevent accidental, unintentional or malicious unlocking as a result of an axial impact on the neck (120), the version described in FIG. 8 has an additional tooth (121) on the inner surface (122) of the neck (120).

The toothed belt is thus locked simultaneously in two areas.

A—On inserting the strap (100) into the locking block (300), the toothing of the strap (100) engages in the toothing (311) of the weight (310). This is the first locking point. The weight (310) consists of a molded plastic part for the toothing and a metallic part (330) forming the housing of the spring (320).

The spring (320) presses the weight (310) against the toothing of the strap (100).

Under the action of the magnet of an unlocking device, the metallic part (330) of the weight (310) will enable the weight (310) to move so as to release the two sets of teeth.

B—A fixed tooth (121) has been molded into the inner surface (122). This tooth (121) creates the second point of mechanical locking.

When the toothing of the belt passes onto the fixed tooth (121) it will make the tooth flex. The belt will return to position due to its molded contour.

According to this embodiment, the belt is locked in 2 points.

In order to release it, the user presses the end (125) of the strap (100) with his finger in order to release the toothing of the belt from the fixed tooth (121).

At the same time, the attraction of the magnet of the unlocking device draws the weight back and releases the other locking point.

The molded contour of the belt creates a spring effect. This spring effect will enable the strap (100) to move backwards when the two locking points are released.

Secondary locking can be achieved by one or more teeth located on the part (220), following a size specific to each tooth so as to offer other locking points to the first part (100).

Alternatively, the belt can have an extension allowing one or more teeth to be unlocked, themselves engaged in the belt in relation to the fixed part (220).

Description of Another Improved Embodiment

FIGS. 9 to 16 represent different views of another variation having a telescopic retractable cap (400) intended to satisfy a universal security requirement for the main alcoholic beverages, wines and popular spirits in shops and supermarkets, particularly bottles such as champagne or sparkling wine bottles, which have very protuberant caps.

This telescopic cap is formed by a first tubular part (410) fixed onto the housing (210) of the detection block (200). A second tubular part (420), the outer section of which is smaller than the inner section of the tubular part (410), slides inside this tubular part (410) to enable an adjustment of the height of the telescopic cap (400). The second tubular part (420) is closed by a transverse disc, which protects the aluminum decorative wrapper provided on certain bottles.

Grooves (411, 421) prevent the two tubular parts (410, 420) from rotating in relation to one another.

This retractable telescopic cap (400) allows the height to be adjusted for any type of bottle, and particularly to take into account the height of the cap fitted on certain types of bottles. These two tubular parts (410, 420) are preferably transparent, made of a rigid plastics material, so as to preserve visibility of the decorative wrapper on the neck of the bottle.

The strap (100) and tubular parts (410) and (420) may have a suitable sign indicating where to limit the tightening of the belt on bottles of champagne so as not to mark and damage the aluminum sheeting covering the top of the bottles of champagne by the flexible or fixed toothing of the belt.

On the side that connects with the housing (210), the two tubular parts (410, 420) have complementary vertical notches (415, 425) designed to lock the movable cap precisely at the level at which the bottle neck to be protected is inserted into the device. These notches (415, 425) are held together on tightening.

The strap (100) has deformable protuberances (114) projecting from its inner surface to adjust the pressure exerted on the decorative metallic tag surrounding the neck of the bottle. These deformable protuberances (114) are in the form of tabs bent upwards so that they define a tapered crown flared downwards, enabling gradual tightening of the strap around the neck of the bottle. This specific toothing of the belt enables it to be adapted to the different necks. In the event of a characterized vertical impact, the flexible toothing of the belt is altered to absorb the deformation due to the increase in the diameter of the bottle resulting from the impact. The toothing then returns to its original position when the thief attempts to remove the device from the neck.

The strap (100) is formed by overmolding a plastics material onto a resilient metallic strip or by inserting a metallic strip into a part made of a plastics material. On the outer side, it has notches extending between the free end (namely that opposite the end extending the casing (210)) and the lug (140). This free end can be engaged in the slot (130), where the locking device prevents the removal of the free end of the strap until the device is unlocked.

An ink security feature is obtained by adding an ink ampoule (500) housed in the casing (210) and intended to prevent and determine theft by breaking the ampoule (500) in the event of an impact on the casing (210). A metallic pin (510) is housed in a slot (520) of the casing (210) in order to break the ampoule (500) in the event of an impact on the casing (210).

The invention claimed is:

1. An anti-theft device, comprising:

a flexible strap having a free end and an end rigidly connected to a locking block, which locks the surface of the strap in a closed position when the free end is inserted into an insertion slot provided in the locking block, the locking block having a hollow cylindrical neck, the strap extending from a base of the locking block, the insertion slot having a cross-section larger or equal to the cross-section of the strap at the top of a tooth, the device further comprising a weight with a locking front surface, the weight being longitudinally movable inside the hollow cylindrical neck and lockable in the locking position by a locking mechanism;

a theft detection device housed in a second block having a housing to receive the hollow cylindrical neck of the locking block;

an additional feature for locking the strap, the additional feature configured to be released by a manual deformation of an additional locking area; and at least one further feature configured to interact with a notched part of the strap in the closed position, the at least one further feature comprising at least one tooth on the surface of the hollow cylindrical neck.

2. The device of claim 1, further comprising a telescopic cap extending from the second block, the telescopic cap having a cylindrical cavity directed toward the strap and closed at an end of the telescopic cap.

3. The device of claim 1, wherein the second block rotates freely about the hollow cylindrical neck.

4. The device of claim 1, wherein the strap and the locking block are molded from a plastic material, the strap further comprising a metallic reinforcement.

5. The device of claim 4, wherein the metallic reinforcement comprises a metallic strip having lateral tabs connecting to an edge of the strap, the lateral tabs comprising a plastic material.

6. The device of claim 4, wherein the strap has projecting protuberances on an inner surface of the strap, the metallic reinforcement having apertures complementary to the protuberances.

7. The device of claim 4, wherein the metallic reinforcement is overmolded by the plastic material of the strap.

8. The device of claim 1, further comprising a telescopic cap formed by a first tubular part fixed onto the housing of the second block and a second tubular part, the outer section of the second tubular part being smaller than the inner section of the first tubular part, so that second tubular part slides inside the first tubular part to enable an adjustment of a height of the telescopic cap.

9. The device of claim 1, wherein the strap has deformable protuberances projecting from an inner surface of the strap to adjust a pressure exerted on a neck of a bottle.

10. The device of claim 9, wherein the deformable protuberances comprise tabs bent upward so as to define a tapered crown flared downward, enabling gradual tightening of the strap around the neck of a bottle.

11. The device of claim 1, further comprising an ink ampoule housed in a casing associated with a metallic pin housed in a slot of the casing in order to break the ampoule in the event of an impact on the casing.

* * * * *